US006773179B2

(12) United States Patent
Huang et al.

(10) Patent No.: US 6,773,179 B2
(45) Date of Patent: Aug. 10, 2004

(54) INPUT DEVICE

(75) Inventors: Mao-Sung Huang, Taoyuan (TW); Chin-Chen Li, Hsinchuang (TW); Jian-Ying Liao, Shiluo Jen (TW)

(73) Assignee: Darfon Electronics Corp., Taoyuan (TW)

( * ) Notice: Subject to any disclaimer, the term of this patent is extended or adjusted under 35 U.S.C. 154(b) by 113 days.

(21) Appl. No.: 10/211,815

(22) Filed: Aug. 2, 2002

(65) Prior Publication Data

US 2003/0026638 A1 Feb. 6, 2003

(30) Foreign Application Priority Data

Aug. 3, 2001 (TW) ........................................ 90119017 A

(51) Int. Cl.[7] ............................................... B41J 5/08
(52) U.S. Cl. .......................... 400/472; 400/489; 400/82
(58) Field of Search ............................... 400/472, 489, 400/82; D41/302, 303, 396; 345/168, 169; 341/22; 361/680

(56) References Cited

U.S. PATENT DOCUMENTS

| | | | | |
|---|---|---|---|---|
| 4,709,972 A | * | 12/1987 | LaBudde et al. | ......... 312/208.3 |
| 5,457,453 A | * | 10/1995 | Chiu et al. | ..................... 341/22 |
| 5,596,482 A | * | 1/1997 | Horikoshi | ................... 361/683 |
| 5,653,543 A | * | 8/1997 | Abe | ........................... 400/489 |
| 6,025,986 A | * | 2/2000 | Sternglass et al. | .......... 361/680 |
| 6,151,012 A | * | 11/2000 | Bullister | ..................... 345/168 |
| 6,256,017 B1 | * | 7/2001 | Bullister | ..................... 345/168 |
| D470,493 S | * | 2/2003 | Tritschler et al. | .......... D14/393 |
| 6,585,440 B2 | * | 7/2003 | Lin | ............................ 400/681 |
| 6,626,686 B1 | * | 9/2003 | D'Souza et al. | ............. 439/131 |

* cited by examiner

Primary Examiner—Andrew H. Hirshfeld
Assistant Examiner—Leo T. Hinze
(74) Attorney, Agent, or Firm—Snell & Wilmer L.L.P.

(57) ABSTRACT

An external input device for a portable computer or personal digital assistant (PDA) has at least one rotatable sideboard. The sideboard operates in two states. When the sideboard is in the first state, the sideboard protects the key sets, and when the sideboard is in a second state, the sideboard facilitates input operation of user.

12 Claims, 5 Drawing Sheets

INPUT DEVICE

This application claims priority of Taiwan Patent Application Serial No. 090119017 filed on Aug. 3, 2001.

FIELD OF INVENTION

Various aspects of the present invention relate to data input devices for a portable digital processing device. More particularly, various aspects relate to a data input device especially adapted for a personal digital assistant (PDA).

BACKGROUND OF THE INVENTION

Since the birth of notebook computers, many types of small-sized computers have been produced. A common problem associated with the smaller size, however, is that miniaturized input/output devices (such as keyboards) can be cumbersome, slow and uncomfortable to use.

The personal digital assist (PDA), which is typically smaller than a notebook computer, has become very popular in recent years. PDAs typically include a liquid crystal display (LCD) for receiving input and displaying information to the user. Unlike the conventional desktop computer, a PDA does not typically have a conventional keyboard, and has only limited control buttons thereon and a stylus that can be used to input data on the display. The PDA may store handwriting in bitmap or another graphical form, but this technique is typically cumbersome to process, requires a large amount of memory and lowers the efficiency of the PDA. Another method for inputting data to a PDA involves handwriting recognition software installed in the PDA. The PDA encoder translates handwriting to ASCII or another alphanumeric code, and then stores the alphanumeric data. Alternatively, the PDA may have a virtual keyboard. When the virtual keyboard is displayed on the screen, a user can utilize the stylus or control buttons to activate keys within the virtual keyboard to input data.

Conventional input methods for PDAs, however, are not typically as efficient as using a conventional computer keyboard. A typical PDA does not include a conventional keyboard because of relatively large size of the keyboard. Various forms of externally-connectable keyboards have been fashioned to work with PDAs, however. When a user wants to input data, the user connects the separable keyboard to the PDA for rapid data entry.

There are at least two types of the conventional separable keyboards for PDAs. One type is similar to the conventional computer keyboard, but smaller in size. The other is a foldable keyboard whereby a keyboard is separated into at least two parts that are foldably connected to each other. When the foldable keyboard is not in use, it can be folded and conveniently stored.

A common problem with prior art folding keyboards is that key switches in the keyboard foldable keyboards can become deformed when the keyboard is folded. Although the overall height of keyboard is reduced when the keyboard is folded, internal elastic elements (i.e., rubber domes or, springs) used to hold or bias the keyboard in position may deteriorate while the keyboard is folded. One way to solve the problem is to provide higher sidewalls along the rim of the foldable keyboard. The higher side-walls, however, typically block the users' hands when he or she operates the key switches, making the keyboard difficult to operate because the user typically has to lift his/her palms to avoid the sidewalls.

SUMMARY OF THE INVENTION

One aspect of the present invention provides a foldable input device with keys that are not necessarily compressed when the input device is folded up. When a user operates the input device in the extension state, the user is allowed to depress the keys near of the side-wall closest to the user without lifting his/her palms away from the table.

Various embodiments of the present invention include a shell that includes a first base having an edge, and a sideboard connected pivotally to the edge. The sideboard has two states. When the sideboard operates in the first state, it is substantially perpendicular to the first base. When the sideboard operates in the second state, it is parallel to the first base substantially. Various embodiments have at least one rotatable sideboard at the side close to the user.

DETAILED DESCRIPTION OF EXEMPLARY EMBODIMENTS

Figure 1:
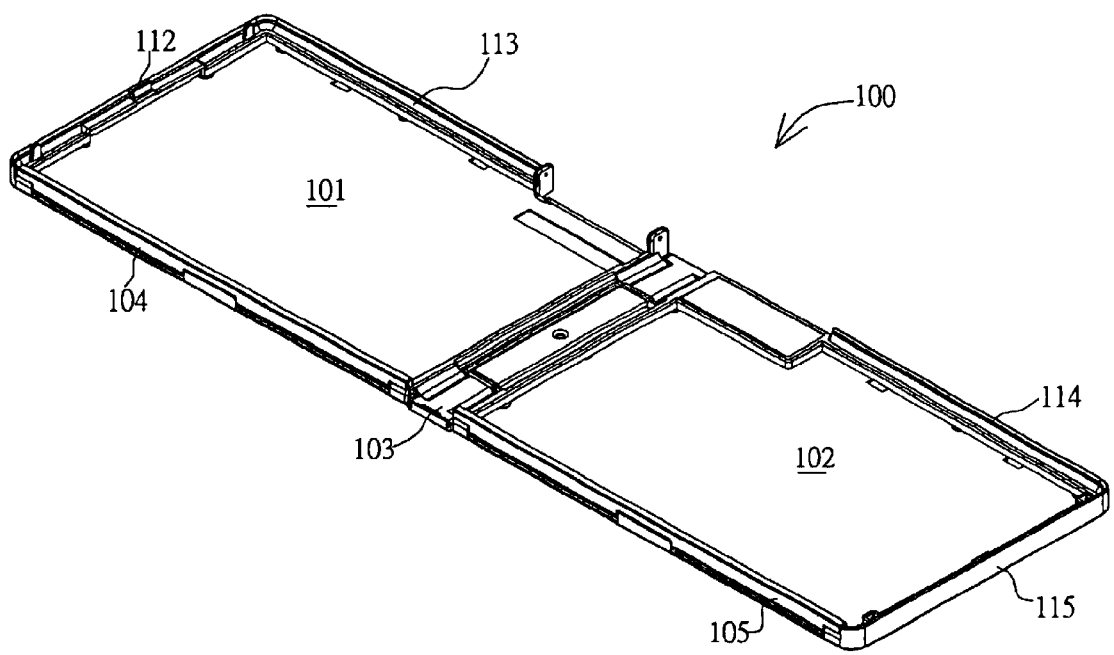
FIG. 1 is a view showing an exemplary sideboard of an exemplary input device operating in a first state.

Referring now to FIG. 1, an exemplary input device includes a shell 100 and a plurality of keys (not shown). The shell 100 includes a first base 101 and a second base 102. The keys are respectively located on the first base 101 and the second base 102. The shape of the two bases is not limited to the rectangle base shown in the figure, and variations and modifications (such as oval, angular, rounded or other-shaped bases) may be made without departing from the scope of the present invention.

Figure 2:
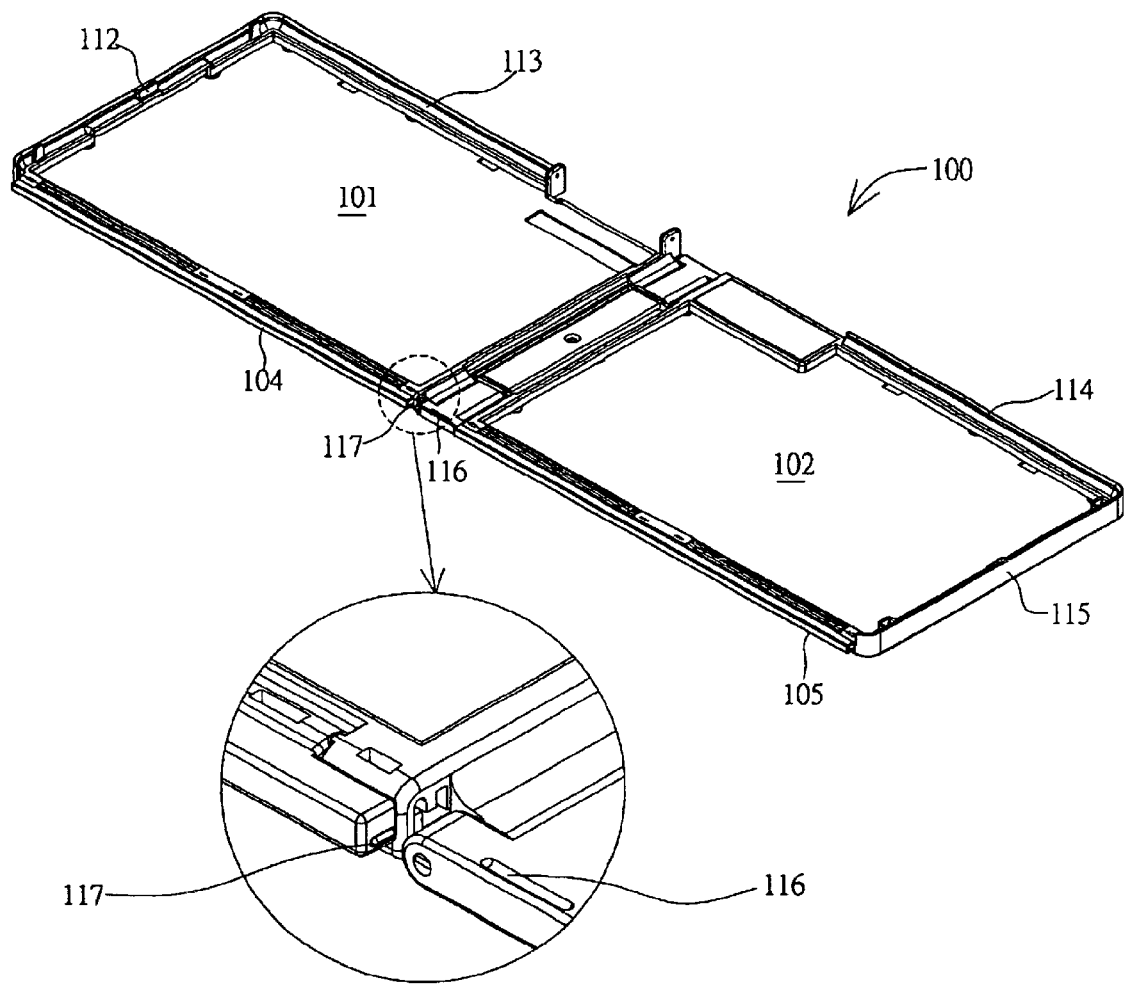
FIG. 2 is a view showing an exemplary sideboard of an exemplary input device operating in a second state.

A first base 101 is connected pivotally to a connecting board 103 as shown. Connecting board 103 is connected pivotally to a second base 102. First base 101 is rotatable and foldable with the second base 102 as appropriate. Sideboards 104 and 105 may be connected pivotally to first base 101 and to second base 102, respectively. Sideboards 104 and 105 relative to first base 101 and second base 102, respectively, operate in two states. When sideboards 104 and 105 are operated in the first state, as shown in FIG. 1, sideboards 104 and 105 are substantially perpendicular to the first and second bases 101, 102, respectively. The term "substantially" is meant to compensate for minor design imperfections and other slight deviations (e.g., on the order of about +/−15 degrees). When sideboards 104 and 105 are operated in the second state, as shown in FIG. 2, sideboards 104 and 105 are positioned substantially parallel to the first and second base 101, 102, respectively. Sideboards 104 and 105 are located on the input device approaching the user so that the user's palms are conveniently supported during operation and data entry.

Then, as shown in FIG. 2, the edges of first base 101 and the edges of second base 102, [not connecting sideboard 104 and connecting board 103 (FIG. 1), respectively], make up fixed sidewalls 112, 113, 114 and 115. When the keyboard is folded, the edges and sideboards 104 and 105 in the first state are disposed to prevent the keys from depressing each other. The height of sidewalls 112, 113, 114, and 115 may be approximately equal to height of sideboards 104 and/or 105.

Figure 3A:
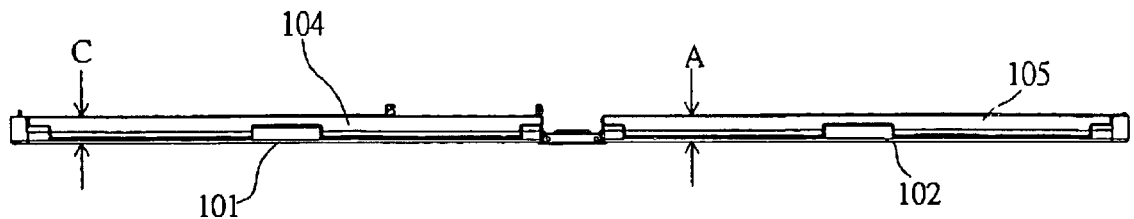
FIG. 3a is a side view showing an exemplary sideboard of an exemplary input device operating in a first state.
Figure 3B:
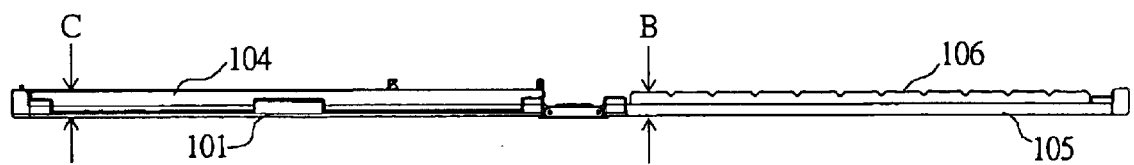
FIG. 3b is a side view showing the second exemplary sideboard of an exemplary input device operating in a second state.

Referring to FIG. 3a, a front view shows one embodiment of the present invention operating in the first state. The FIG. 3b is a view of second base 102 operating in the second state. The embodiment shown includes a number of keys located on the first and second base 101 and 102. When sideboard 105 is operated in the second state, for example, a key surface 106 formed by the keys is shown in FIG. 3b. Relative to the second base 102, the height of sideboard 105 has a first value A, as shown in FIG. 3a. The height of surface 106 has a second value B, as shown in FIG. 3b. The first value A may be designed to be greater than the second value B so as to prevent the keys from being depressed when folding first and second bases 101 and 102 together. Therefore, relative to first base 101, the height of sideboard 104 has a third value C that is correspondingly greater than the height of the second value B.

Figure 4:
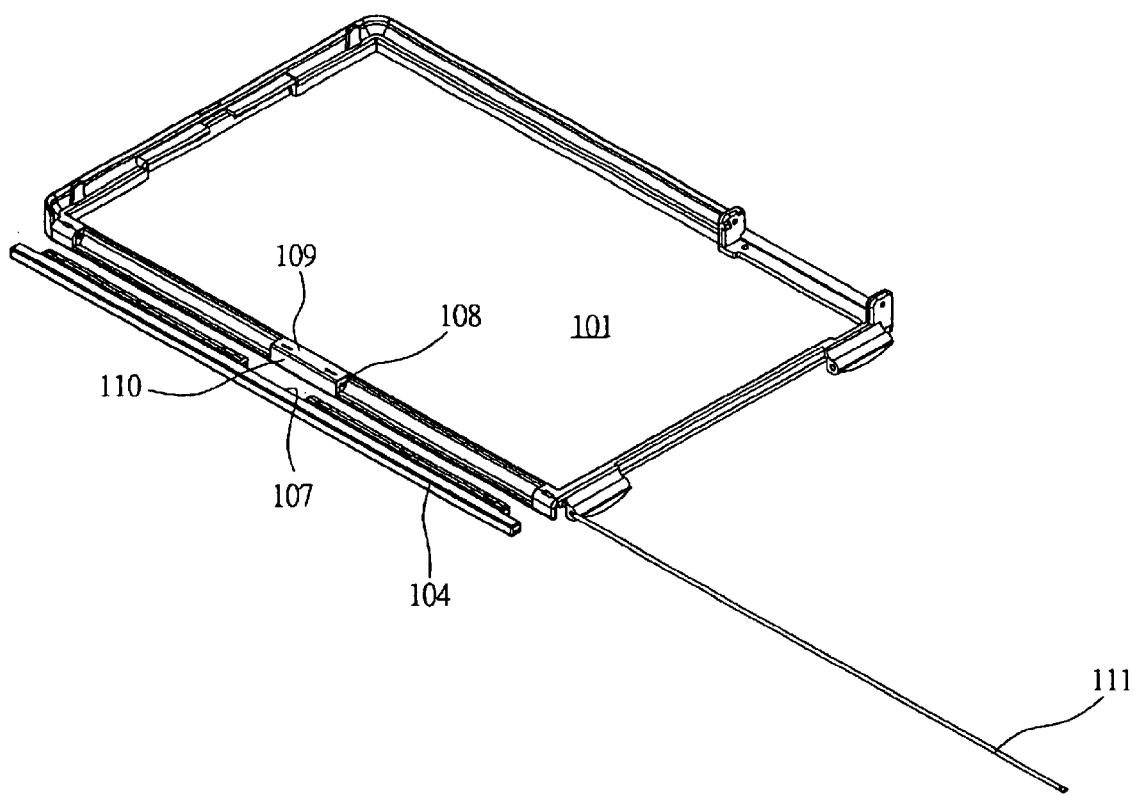
FIG. 4 is a view showing an exemplary retaining device of an exemplary input device.

FIG. 4 is a view of first base 101 and sideboard 104. Sideboard 104 has a first contact surface 107 configured to touch the edge of the first base 101. The edge of first base 101 has a protrusion 108 configured to touch sideboard 104. Protrusion 108 has a second contact surface 109 and a third contact surface 110. When sideboard 104 is operated in the first state, first contact surface 107 suitably interfaces with the second contact surface 109. When sideboard 104 is operated in the second state, first contact surface 107 interfaces with third contact surface 110, as appropriate. Sideboard 104 may be connected pivotally to the protrusion 108 with a shaft 111, or a hinge, ball joint or other structure.

In order to fix sideboards 104 or 105 in the first state when the keyboard is folded, one embodiment of the present invention shown in FIG. 4 has a retaining device. Other embodiments may combine different kinds of the retaining device to selectively fix sideboard 104 in the first state. The following description is based on first base 101, sideboard 104, connecting board 103, and sidewalls 112 and 113. The same mechanism may be applied to the second base 102 in any convenient manner.

Figure 5:
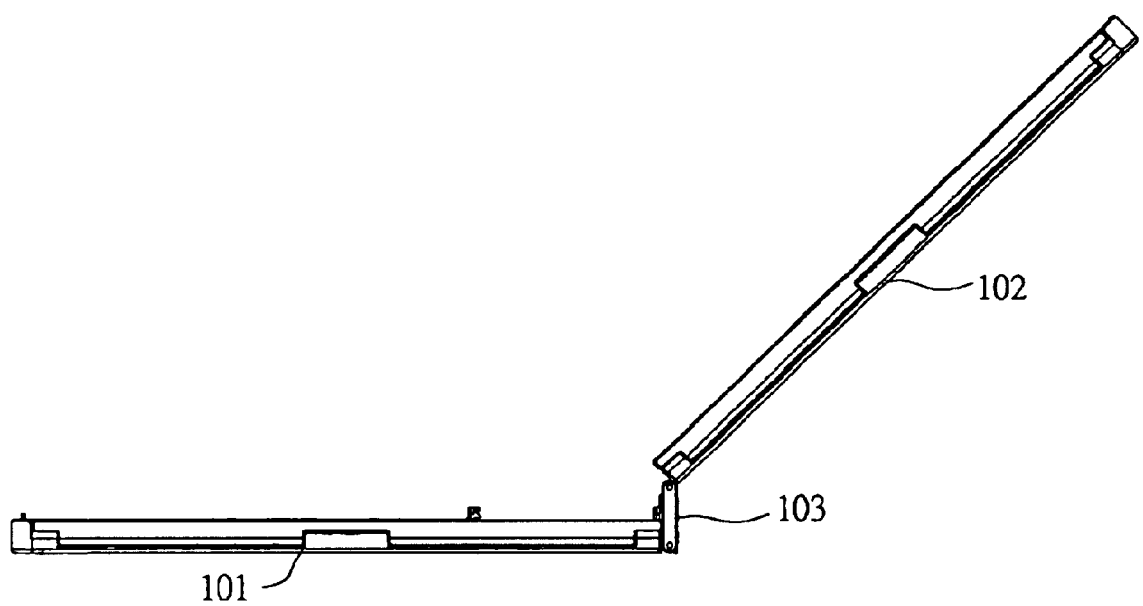
FIG. 5 is a view showing an exemplary connecting board of an exemplary input device wherein the connecting board is configured perpendicular to a first base.

Referring again to FIG. 2, the embodiment shown has a projection 117 on sideboard 104 configured to touch connecting board 103. Connecting board 103 has a depression 116 corresponding to projection 117, as appropriate. When connecting board 103 is perpendicular to the first base 101 (e.g., as sideboard 104 is in the first state, as shown in FIG. 5) the projection 117 suitably meshes the depression 116.

In another embodiment, the position of the depression and the projection may substitute for each other. That is, depression 116 on connecting board 103 substitutes for the projection (not shown). Projection 117 on connecting board 104 substitutes for the depression (not shown). When connecting board 103 is perpendicular to first base 101 as the sideboard is in the first state, the projection engages with the depression to fix the sideboard so that the sideboard is operated in the first state. In the embodiment of the present invention, it should be noted that the amount of the pair of the depression and the projection is not to be limited to single pair. Various changes may be made in the design and arrangement of the elements described in the exemplary embodiments herein without departing from the scope of the invention as set forth in the appended claims. For example, alternate embodiments may have more than one pair of the depression and the projection on sideboard 104, or the depression and the projection is disposed on the contact portion between sidewall 112 and sideboard 104.

While this invention has been described with reference to an illustrative embodiment, this embodiment is not intended to be construed in a limiting sense. Various modifications of the illustrative embodiment, as well as other embodiments of the invention, will be apparent upon reference to this description. It is therefore contemplated that the appended claims will cover any such modifications or embodiments as falling within the true scope of the invention and its legal equivalents.

What is claimed is:

1. An input device, comprising:
   a first base, having an edge;
   a key set, located on said first base and having a side-surface;
   a sideboard, connected pivotally to a near-user end of said edge, said sideboard selectively operating in a first and a second state and
   a second base and a connecting board, said first base connected pivotally to said connecting board, said connecting board connected pivotally to said second base;
   wherein, said sideboard projects over said first base and covers said side-surface when said sideboard is in said first state, and wherein the height of said sideboard is reduced by pivotal rotation of said sideboard, resulting in said side-surface being exposed, so as to allow a user who operates said key set at said near-user end a better access, when said sideboards is in said second state.

2. The input device of claim 1, wherein said key set has a key surface, and, relative to said first base, height of said sideboard has a first value, a height of said key surface has a second value, and wherein said first value is greater than said second value.

3. The input device of claim 1, wherein the input device further comprises a retaining device for selectively biasing said sideboard to operate in said first state.

4. The input device of claim 1, wherein said sideboard has a first contact surface configured to touch said edge, and wherein said edge has a protrusion configured to interface with said sideboard, and wherein said protrusion has a second and a third contact surface, and wherein said second contact surface touches said first contact surface when said sideboard is in said first state and said third contact surface touches said first contact surface when said sideboard is in said second state.

5. The input device of claim 1, wherein said input device further comprises a plurality of sidewalls located on a portion of said edge not connecting said sideboard, said sidewalls are perpendicular to said first base substantially, and wherein the heights of said sidewalls are respectively equal to the height of said sideboard as said sideboard is in said first state.

6. A foldable input device, comprising:
   a first base, having a first edge;
   a second base, having a second edge;
   a plurality of keys, located on said first and said second base, respectively, each of said keys having a first and a second side-surface respectively;
   a first sideboard, connected pivotally to a first near-user end on said first edge, said first sideboard selectively operating in a first and a second state, wherein as said first sideboard is in said first state, said first sideboard projects over said first base and covers said first side-surface, and as said first sideboard is in said second state, the height of said first sideboard is reduced by pivotal rotation of said first sideboard, resulting in said first side-surface being exposed;

a second sideboard, connected pivotally to a second near-user end on said second edge, said second sideboard selectively operating in a first and a second state, wherein as said second sideboard is in said first state, said second sideboard projects over said second base and covers said second side-surface, and as said second sideboard is in said second state, the height of said second sideboard is reduced by pivotal rotation of said second sideboard, resulting in said second side-surface being exposed; and a connecting board, having a first and a second end, wherein said first and second end are connected pivotally to said first and said second base respectively, resulting in said first base rotating oppositely to said second base, and when a user operates said keys at said first and second near-user end, height of said first and second sideboard are reduced so as to prevent said user from touching said first and second sideboard.

7. The input device of claim 6, wherein said keys has a key surface, and, relative to said first base, the height of said first sideboard has a first value, the height of said key surface has a second value, the height of said second base has a third value, and wherein said first and third value are substantially greater than said second value.

8. The input device of claim 7 wherein a portion of said first edge not connecting said first sideboard and a portion of said second edge not connecting said second sideboard further respectively comprise a plurality of sidewalls, said sidewalls are perpendicular to said first and second bases respectively, height of said sidewalls relative to said first and second base are respectively equal to said first value and said third value as said first and said second sideboard are in said first state.

9. The input device of claim 6, wherein the input device further comprises a retaining device configured to selectively fix said first and second sideboard to operate in said first state.

10. The input device of claim 6, wherein said first sideboard has a first contact surface configured to touch said first edge, said first edge has a first protrusion configured to touch said first sideboard, said first protrusion has a second and a third contact surface respectively, wherein said first contact surface touches said second contact surface as said first sideboard is in said first state, and wherein said first contact surface touches said third contact surface as said first sideboard is in said second state.

11. The input device of claim 6 wherein said second sideboard has a fourth contact surface for touching said second edge, said second edge has a second protrusion for touching said second sideboard, said second protrusion has a fifth and a sixth contact surface respectively, wherein said fourth contact surface touches said fifth contact surface as said second sideboard is in said first state, and wherein said fourth contact surface touches said sixth contact surface as said second sideboard is in said second state.

12. An input device providing data input from a user to a portable computer, the input device comprising first and second bases supporting a set of keys and being rotatably coupled to each other by a connecting board, wherein the first and second base define a shell having sidewalls about the perimeter of the input device, and wherein a rotatable portion of the sidewalls closest the user is configured to rotate between a first state providing access to the key sets and a second state protecting the key sets.

* * * * *